US012634282B2

(12) United States Patent
Gopalappa et al.

(10) Patent No.: US 12,634,282 B2
(45) Date of Patent: *May 19, 2026

(54) AUTOMATED SATELLITE DEVICE AUTHENTICATION TO A PORTAL FOR SECURE REMOTE ACCESS

(71) Applicant: Palo Alto Networks, Inc., Santa Clara, CA (US)

(72) Inventors: Madhusudhan Gopalappa, San Jose, CA (US); Tengda Shi, San Jose, CA (US); Xin Yao, San Jose, CA (US); Xun Zhou, Cupertino, CA (US)

(73) Assignee: Palo Alto Networks, Inc., Santa Clara, CA (US)

( * ) Notice: Subject to any disclaimer, the term of this patent is extended or adjusted under 35 U.S.C. 154(b) by 262 days.

This patent is subject to a terminal disclaimer.

(21) Appl. No.: 18/389,540

(22) Filed: Nov. 14, 2023

(65) Prior Publication Data

US 2025/0158985 A1 May 15, 2025

(51) Int. Cl.
| | |
|---|---|
| *H04W 12/06* | (2021.01) |
| *G06F 21/44* | (2013.01) |
| *H04L 9/40* | (2022.01) |
| *H04W 12/71* | (2021.01) |
| *H04W 80/04* | (2009.01) |

(52) U.S. Cl.
CPC ...... *H04L 63/0876* (2013.01); *H04L 63/0236* (2013.01); *H04L 63/0272* (2013.01)

(58) Field of Classification Search
None
See application file for complete search history.

(56) References Cited

U.S. PATENT DOCUMENTS

| | | | |
|---|---|---|---|
| 6,012,100 | A | 1/2000 | Frailong |
| 6,892,235 | B1 | 5/2005 | Daude |
| 7,093,283 | B1 | 8/2006 | Chen |
| 7,209,479 | B2 | 4/2007 | Larson |
| 7,340,768 | B2 | 3/2008 | Rosenberger |
| 7,673,048 | B1 | 3/2010 | O'Toole, Jr. |
| 7,987,264 | B1 | 7/2011 | Gill |

(Continued)

OTHER PUBLICATIONS

Jo et al., ETRI, A Method for Security Policy Enforcement of Security Router Platform, APNOMS, 2006.

(Continued)

*Primary Examiner* — Venkat Perungavoor

(74) *Attorney, Agent, or Firm* — Van Pelt, Yi & James LLP

(57) ABSTRACT

Techniques for automated satellite device authentication to a portal for secure remote access are disclosed. In some embodiments, a system, a process, and/or a computer program product for automated satellite device authentication to a portal for secure remote access include receiving, at a portal, a serial number and an IP address associated with a new satellite for deployment in a large scale virtual private network (LSVPN) deployment; receiving, at the portal, the serial number and the IP address associated with the new satellite, wherein the new satellite is deployed at a remote location, and wherein the new satellite automatically sends the serial number and the IP address associated with the new satellite to the portal; and authenticating the new satellite at the portal using the serial number and the IP address associated with the new satellite.

14 Claims, 6 Drawing Sheets

(56)                References Cited

U.S. PATENT DOCUMENTS

| | | | |
|---|---|---|---|
| 8,020,203 B2 | 9/2011 | Kumar | |
| 8,042,147 B2 | 10/2011 | Byres | |
| 8,176,532 B1 | 5/2012 | Cook | |
| 8,220,041 B2 | 7/2012 | Boyce | |
| 8,316,435 B1 | 11/2012 | Varadhan | |
| 8,370,917 B1 | 2/2013 | Hayes | |
| 8,406,170 B2 | 3/2013 | Rune | |
| 8,479,267 B2 | 7/2013 | Donley | |
| 8,793,361 B1 | 7/2014 | Riddle | |
| 8,842,687 B1 | 9/2014 | Jackson | |
| 8,910,241 B2 | 12/2014 | Pollutro | |
| 8,966,260 B1* | 2/2015 | Walter | H04L 63/029 |
| | | | 713/168 |
| 8,973,088 B1 | 3/2015 | Leung | |
| 10,581,619 B2* | 3/2020 | Feng | G06F 21/33 |
| 11,790,761 B1* | 10/2023 | Jones, Jr. | H04B 7/18513 |
| | | | 340/539.1 |
| 12,231,467 B1* | 2/2025 | Will | H04L 63/20 |
| 2002/0178355 A1 | 11/2002 | D Sa et al. | |
| 2003/0217150 A1 | 11/2003 | Roese | |
| 2003/0225893 A1 | 12/2003 | Roese | |
| 2003/0229808 A1 | 12/2003 | Heintz | |
| 2004/0103310 A1 | 5/2004 | Sobel | |
| 2004/0225895 A1 | 11/2004 | Mukherjee | |
| 2006/0013191 A1 | 1/2006 | Kavanagh | |
| 2006/0053290 A1 | 3/2006 | Randle | |
| 2006/0053491 A1 | 3/2006 | Khuti | |
| 2006/0075503 A1 | 4/2006 | Bunker | |
| 2006/0105741 A1 | 5/2006 | Suh | |
| 2006/0179031 A1 | 8/2006 | Lewis | |
| 2006/0209836 A1 | 9/2006 | Ke | |
| 2006/0259779 A2 | 11/2006 | Oliphant | |
| 2006/0277408 A1 | 12/2006 | Bhat | |
| 2007/0011733 A1 | 1/2007 | Gbadegesin | |
| 2007/0143392 A1 | 6/2007 | Choe | |
| 2007/0266421 A1 | 11/2007 | Vaidya | |
| 2008/0022355 A1 | 1/2008 | Khosravi | |
| 2008/0028456 A1 | 1/2008 | O'Rourke | |
| 2008/0196088 A1 | 8/2008 | Dmitri | |
| 2008/0244747 A1 | 10/2008 | Gleichauf | |
| 2008/0247382 A1 | 10/2008 | Verma | |
| 2008/0255928 A1 | 10/2008 | Tomeny | |
| 2008/0282080 A1 | 11/2008 | Hyndman | |
| 2008/0301765 A1 | 12/2008 | Nicol | |
| 2008/0318657 A2 | 12/2008 | Okada | |
| 2008/0320582 A1 | 12/2008 | Chen | |
| 2009/0094691 A1 | 4/2009 | Dargis | |
| 2009/0129580 A1 | 5/2009 | Terpstra | |
| 2009/0144817 A1 | 6/2009 | Kumar | |
| 2009/0228974 A1 | 9/2009 | Ivanov | |
| 2009/0307753 A1 | 12/2009 | Dupont | |
| 2009/0328192 A1 | 12/2009 | Yang | |
| 2010/0054222 A1 | 3/2010 | Rune | |
| 2010/0100930 A1 | 4/2010 | King | |
| 2010/0138910 A1 | 6/2010 | Aldor | |
| 2010/0192196 A1 | 7/2010 | Lee | |
| 2010/0242088 A1 | 9/2010 | Thomas | |
| 2010/0248720 A1 | 9/2010 | Millet | |
| 2010/0306816 A1 | 12/2010 | Mcgrew | |
| 2010/0333177 A1 | 12/2010 | Donley | |
| 2011/0023084 A1 | 1/2011 | Kraemer | |
| 2011/0242979 A1 | 10/2011 | Feroz | |
| 2012/0005746 A1 | 1/2012 | Wei | |
| 2012/0144492 A1 | 6/2012 | Griffin | |
| 2012/0198519 A1 | 8/2012 | Parla | |
| 2012/0204253 A1 | 8/2012 | Sugimoto | |
| 2012/0210417 A1 | 8/2012 | Shieh | |
| 2012/0240182 A1 | 9/2012 | Narayanaswamy | |
| 2012/0272293 A1 | 10/2012 | Jankowski | |
| 2012/0303808 A1 | 11/2012 | Xie | |
| 2021/0157013 A1* | 5/2021 | Lyusin | H04W 4/027 |
| 2024/0406841 A1* | 12/2024 | Raghavan | H04B 7/18502 |
| 2025/0031256 A1* | 1/2025 | Hao | H04W 76/11 |
| 2025/0106600 A1* | 3/2025 | Wright | H04B 7/18563 |

OTHER PUBLICATIONS

Muller et al., An Assisted Device Registration and Service Access System for Future Home Networks, IEEE, 2009.

* cited by examiner

100

| Serial number and IP Address Authentication Method | Configured retry-interval (Default is 5 seconds) | Serial Number | IP Address in allow list | Satellite Cookie | Established Authentication Method |
|---|---|---|---|---|---|
| Enabled | Value is greater than 0 | Registered | Allowed | Will not be checked | Serial number and IP Address Authentication method will be established successfully. |
| Enabled | Value is greater than 0 | Registered | Not Allowed | Will not be checked | Fails to establish Serial number and IP Address Authentication. |
| Enabled | Value is greater than 0 | Not Registered | Will not be checked | Will not be checked | Fails to establish Serial number and IP Address Authentication. |
| Disabled | Will not be checked | Will not be checked | Will not be checked | Default behavior | Default authentication method, Username/password and Satellite Cookie Authentication method will be established successfully. |

AUTOMATED SATELLITE DEVICE AUTHENTICATION TO A PORTAL FOR SECURE REMOTE ACCESS

BACKGROUND OF THE INVENTION

A firewall generally protects networks from unauthorized access while permitting authorized communications to pass through the firewall. A firewall is typically a device or a set of devices, or software executed on a device, such as a computer, that provides a firewall function for network access. For example, firewalls can be integrated into operating systems of devices (e.g., computers, smart phones, or other types of network communication capable devices). Firewalls can also be integrated into or executed as software on computer servers, gateways, network/routing devices (e.g., network routers), or data appliances (e.g., security appliances or other types of special purpose devices).

Firewalls typically deny or permit network transmission based on a set of rules. These sets of rules are often referred to as policies. For example, a firewall can filter inbound traffic by applying a set of rules or policies. A firewall can also filter outbound traffic by applying a set of rules or policies. Firewalls can also be capable of performing basic routing functions.

BRIEF DESCRIPTION OF THE DRAWINGS

Various embodiments of the invention are disclosed in the following detailed description and the accompanying drawings.

FIG. 4 illustrates a configuration settings table for serial number and IP address authentication of a satellite with a portal and a gateway for a Large Scale VPN deployment in accordance with some embodiments.

DETAILED DESCRIPTION

Figure 1:
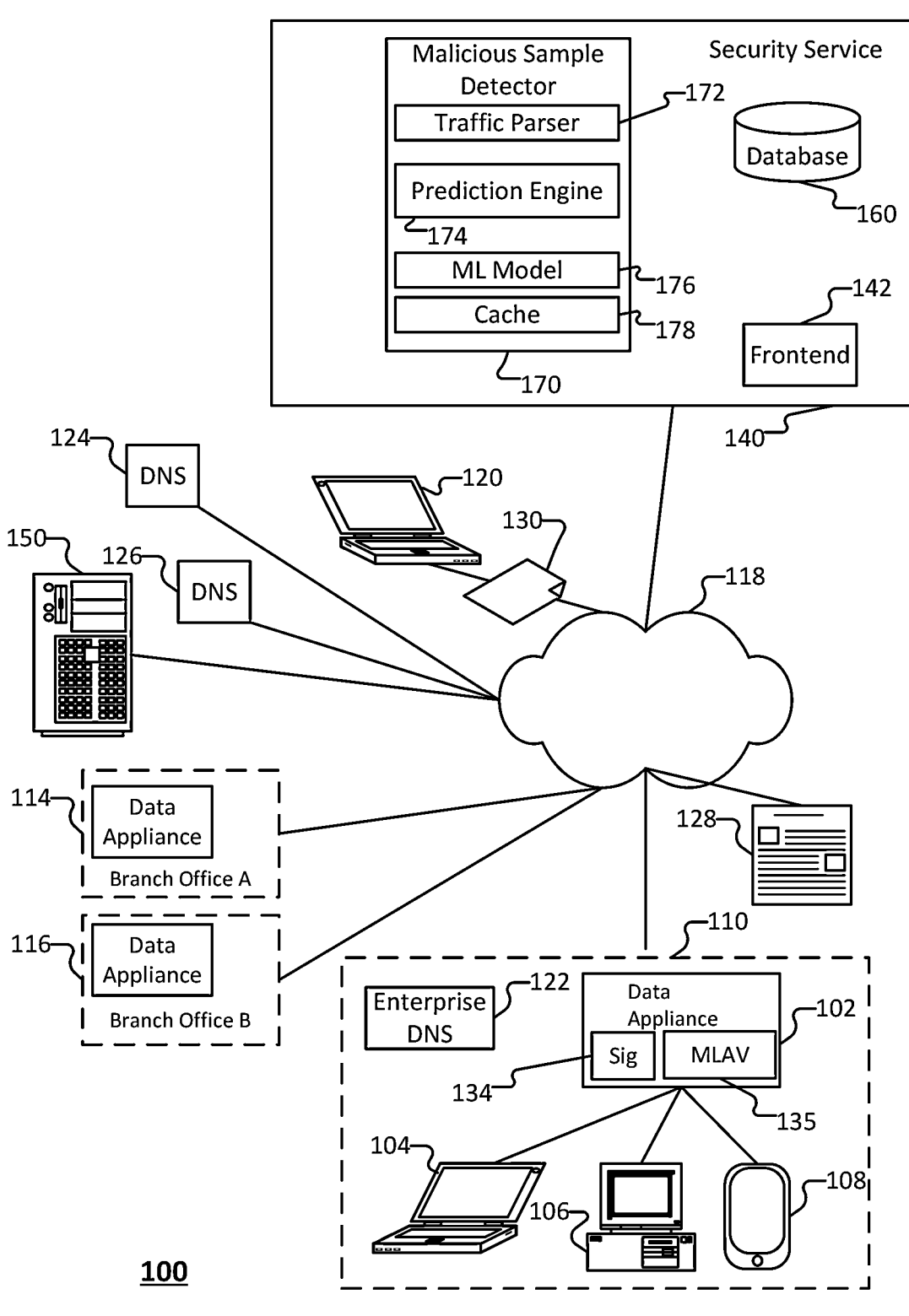
FIG. 1 is a block diagram of an environment in which malicious traffic is detected or suspected in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Advanced or Next Generation Firewalls

Malware is a general term commonly used to refer to malicious software (e.g., including a variety of hostile, intrusive, and/or otherwise unwanted software). Malware can be in the form of code, scripts, active content, and/or other software. Example uses of malware include disrupting computer and/or network operations, stealing proprietary information (e.g., confidential information, such as identity, financial, and/or intellectual property related information), and/or gaining access to private/proprietary computer systems and/or computer networks. Unfortunately, as techniques are developed to help detect and mitigate malware, nefarious authors find ways to circumvent such efforts. Accordingly, there is an ongoing need for improvements to techniques for identifying and mitigating malware.

A firewall generally protects networks from unauthorized access while permitting authorized communications to pass through the firewall. A firewall is typically a device, a set of devices, or software executed on a device that provides a firewall function for network access. For example, a firewall can be integrated into operating systems of devices (e.g., computers, smart phones, or other types of network communication capable devices). A firewall can also be integrated into or executed as software applications on various types of devices or security devices, such as computer servers, gateways, network/routing devices (e.g., network routers), or data appliances (e.g., security appliances or other types of special purpose devices, and in some implementations, certain operations can be implemented in special purpose hardware, such as an ASIC or FPGA).

Firewalls typically deny or permit network transmission based on a set of rules. These sets of rules are often referred to as policies (e.g., network policies or network security policies). For example, a firewall can filter inbound traffic by applying a set of rules or policies to prevent unwanted outside traffic from reaching protected devices. A firewall can also filter outbound traffic by applying a set of rules or policies (e.g., allow, block, monitor, notify or log, and/or other actions can be specified in firewall rules or firewall policies, which can be triggered based on various criteria, such as described herein). A firewall can also filter local network (e.g., intranet) traffic by similarly applying a set of rules or policies.

Security devices (e.g., security appliances, security gateways, security services, and/or other security devices) can perform various security operations (e.g., firewall, anti-malware, intrusion prevention/detection, proxy, and/or other security functions), networking functions (e.g., routing, Quality of Service (QOS), workload balancing of network related resources, and/or other networking functions), and/or other security and/or networking related operations. For example, routing can be performed based on source information (e.g., IP address and port), destination information (e.g., IP address and port), and protocol information (e.g., layer-3 IP-based routing).

A basic packet filtering firewall filters network communication traffic by inspecting individual packets transmitted over a network (e.g., packet filtering firewalls or first generation firewalls, which are stateless packet filtering firewalls). Stateless packet filtering firewalls typically inspect the individual packets themselves and apply rules based on the inspected packets (e.g., using a combination of a packet's source and destination address information, protocol information, and a port number).

Application firewalls can also perform application layer filtering (e.g., using application layer filtering firewalls or second generation firewalls, which work on the application level of the TCP/IP stack). Application layer filtering firewalls or application firewalls can generally identify certain applications and protocols (e.g., web browsing using HyperText Transfer Protocol (HTTP), a Domain Name System (DNS) request, a file transfer using File Transfer Protocol (FTP), and various other types of applications and other protocols, such as Telnet, DHCP, TCP, UDP, and TFTP (GSS)). For example, application firewalls can block unauthorized protocols that attempt to communicate over a standard port (e.g., an unauthorized/out of policy protocol attempting to sneak through by using a non-standard port for that protocol can generally be identified using application firewalls).

Stateful firewalls can also perform stateful-based packet inspection in which each packet is examined within the context of a series of packets associated with that network transmission's flow of packets/packet flow (e.g., stateful firewalls or third generation firewalls). This firewall technique is generally referred to as a stateful packet inspection as it maintains records of all connections passing through the firewall and is able to determine whether a packet is the start of a new connection, a part of an existing connection, or is an invalid packet. For example, the state of a connection can itself be one of the criteria that triggers a rule within a policy.

Advanced or next generation firewalls can perform stateless and stateful packet filtering and application layer filtering as discussed above. Next generation firewalls can also perform additional firewall techniques.

For example, certain newer firewalls sometimes referred to as advanced or next generation firewalls can also identify users and content. In particular, certain next generation firewalls are expanding the list of applications that these firewalls can automatically identify to thousands of applications. Examples of such next generation firewalls are commercially available from Palo Alto Networks, Inc. (e.g., Palo Alto Networks' PA Series firewalls).

For example, Palo Alto Networks' next generation firewalls enable enterprises to identify and control applications, users, and content—not just ports, IP addresses, and packets—using various identification technologies, such as the following: App-ID for accurate application identification, User-ID for user identification (e.g., by user or user group), and Content-ID for real-time content scanning (e.g., controls web surfing and limits data and file transfers). These identification technologies allow enterprises to securely enable application usage using business-relevant concepts, instead of following the traditional approach offered by traditional port-blocking firewalls.

Also, special purpose hardware for next generation firewalls implemented, for example, as dedicated appliances generally provide higher performance levels for application inspection than software executed on general purpose hardware (e.g., such as security appliances provided by Palo Alto Networks, Inc., which utilize dedicated, function specific processing that is tightly integrated with a single-pass software engine to maximize network throughput while minimizing latency).

Advanced or next generation firewalls can also be implemented using virtualized firewalls. Examples of such next generation firewalls are commercially available from Palo Alto Networks, Inc. (e.g., Palo Alto Networks' firewalls, which support various commercial virtualized environments, including, for example, VMware® ESXi™ and NSX™, Citrix® Netscaler SDX™, KVM/OpenStack (Centos/RHEL, Ubuntu®), and Amazon Web Services (AWS)).

For example, virtualized firewalls can support similar or the exact same next-generation firewall and advanced threat prevention features available in physical form factor appliances, allowing enterprises to safely enable applications flowing into, and across their private, public, and hybrid cloud computing environments. Automation features such as VM monitoring, dynamic address groups, and a REST-based API allow enterprises to proactively monitor VM changes dynamically feeding that context into security policies, thereby eliminating the policy lag that may occur when VMs change.

Technical Challenges for Secure Remote Access

There exist technical challenges for secure remote access.

Specifically, there are technical challenges associated with deploying satellite devices. Example satellite devices include a security device/data appliance (e.g., a firewall, such as commercially available from Palo Alto Networks, which is headquartered in Santa Clara, CA, or another firewall device can similarly be used). The satellite devices can be deployed at remote locations, such as at branch offices of an enterprise. The satellite devices can be configured to enable the satellites to establish secure network connectivity (e.g., Virtual Private Network (VPN) connectivity) to a gateway(s) for secure remote access from the branch offices.

More specifically, there currently exists two approaches for deploying a satellite device (e.g., also referred to herein as a satellite) remotely to authenticate the satellite with a portal for secure remote access: (1) using a Serial Number (SN) associated with the satellite device; and (2) using an authentication cookie in combination with username/password credentials. For example, using such existing approaches for authentication of a newly deployed satellite device, if the authentication fails based on the SN, then a username/password can be entered to attempt to authenticate the satellite via a portal for secure remote access (e.g., a GlobalProtect (GP) portal, such as commercially available from Palo Alto Networks, which is headquartered in Santa Clara, CA, or another portal for secure remote access can similarly be used).

However, the username/password approach typically prevents a customer from automating the deployment of the remote satellites. In addition, the username/password approach adds additional difficulties and complexities for users performing a new deployment of satellites and/or a software upgrade of satellites (e.g., satellite nodes, such as firewalls).

In cases of remote deployments of satellites, a satellite can be pre-configured with all the necessary information and shipped to the remote location. However, if authentication fails when the satellite attempts to connect to the portal for secure remote access (e.g., the GP portal), then an Information Technology (IT)/network/security administrator (admin) generally would need to be present at the remote location to enter the username/password credentials, which is not an automated solution for the deployment and authentication of such satellites (e.g., and can present logistical challenges for enterprises that may not have such an admin available at various branch office locations). As a result, existing approaches generally can require manual intervention during the deployment of the remote satellite devices.

As such, new and improved solutions for deploying satellites for secure remote access are needed.

Overview of Techniques for Automated Satellite Device Authentication to a Portal for Secure Remote Access Accordingly, various techniques for automated satellite device authentication to a portal for secure remote access are disclosed.

In some embodiments, a system, a process, and/or a computer program product for automated satellite device authentication to a portal for secure remote access includes receiving, at a portal, a serial number and an IP address associated with a new satellite for deployment in a large scale virtual private network (LSVPN) deployment; receiving, at the portal, the serial number and the IP address associated with the new satellite, wherein the new satellite is deployed at a remote location, and wherein the new satellite automatically sends the serial number and the IP address associated with the new satellite to the portal; and authenticating the new satellite at the portal using the serial number and the IP address associated with the new satellite.

For example, to overcome the above-described manual intervention during the deployment of the remote satellite device, the disclosed techniques for providing automated satellite device authentication to a portal for secure remote access can include a mechanism in which the admin performs the following (e.g., prior to deployment and/or performed remotely from the remote location of the satellite deployment): (1) pre-configures the satellite device, which can then be deployed at the remote location; and (2) configures the Serial Number (SN) and Internet Protocol (IP) address allowed list on the portal for secure remote access (e.g., GP portal). In addition, a new authentication mechanism is provided at the portal for secure remote access (e.g., GP portal) in which the SN and IP address can be used in combination to automatically authenticate the satellite device.

As such, whenever the satellite attempts to authenticate with the portal for secure remote access (e.g., GP portal), the satellite authenticates based on whether the SN is registered and the satellite device's assigned IP address is present in the IP allowed list (e.g., which can be configured at the portal for secure remote access (e.g., GP portal) as described above).

Thus, the disclosed techniques overcome the above-described manual intervention during the deployment of remote satellite devices by providing automated satellite device authentication to a portal for secure remote access to facilitate a more effective and efficient solution for automated deployment of such satellite devices for secure remote access, such as will be further described below.

Moreover, by applying the disclosed techniques for automated satellite device authentication to a portal for secure remote access, no manual intervention is needed at the remote satellite device site during the onboarding of the satellite device, such as will be further described below.

Also, if there is a failure of the authentication from the remote satellite device, then the remote satellite can automatically re-trigger the authentication processing with the portal for secure remote access (e.g., using the SN and IP address information as described above), which can be configured to be automatically performed after every pre-configurable retry interval time period is elapsed (e.g., which can be a configuration time period), such as will be further described below.

In addition, the disclosed techniques for automated satellite device authentication to a portal for secure remote access enhance the software upgrade process and smooth network and operation maintenance experiences for enterprise admins/users, such as will be further described below.

Further, the disclosed techniques for automated satellite device authentication to a portal for secure remote access can be similarly applied to various Large Scale Virtual Private Network (LSVPN) solutions (e.g., various cloud service provider solutions, such as for security cloud service providers, including, for example, the GlobalProtect® Large Scale Virtual Private Network for satellite node deployments that is commercially available from Palo Alto Networks, Inc., headquartered in Santa Clara, CA, such as will be further described below with respect to various embodiments).

These and additional system embodiments for providing automated satellite device authentication to a portal for secure remote access will now be further described below.

Example System Embodiments for Automated Satellite Device Authentication to a Portal for Secure Remote Access FIG. 1 is a block diagram of an environment in which a malicious traffic is detected or suspected in accordance with some embodiments. In the example shown, client devices 104-108 are a laptop computer, a desktop computer, and a tablet (respectively) present in an enterprise network 110 (belonging to the "Acme Company"). Data appliance 102 is configured to enforce policies (e.g., a security policy) regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, inputs to application portals (e.g., web interfaces), files exchanged through instant messaging programs, and/or other file transfers. In some embodiments, data appliance 102 is also configured to enforce policies with respect to traffic that stays within (or from coming into) enterprise network 110.

In the example shown, data appliance 102 is a security platform, also referred to herein as an inline security entity. Data appliance 102 performs low-latency processing/analysis of incoming data (e.g., traffic data) and determines whether to offload any processing of the incoming data to a cloud system, such as security service 140.

Techniques described herein can be used in conjunction with a variety of platforms (e.g., desktops, mobile devices, gaming platforms, embedded systems, etc.) and/or a variety of types of applications (e.g., Android .apk files, iOS applications, Windows PE files, Adobe Acrobat PDF files, Microsoft Windows PE installers, etc.). In the example environment shown in FIG. 1, client devices 104-108 are a laptop computer, a desktop computer, and a tablet (respectively) present in an enterprise network 110. Client device 120 is a laptop computer present outside of enterprise network 110.

Data appliance 102 can be configured to work in cooperation with a remote security service 140 (e.g., a cloud-based security service, also referred to as a cloud service or a cloud security service). Security service 140 may be a cloud system such as a cloud service security entity. Security service 140 can provide a variety of services, including performing static and dynamic analysis on malware samples, providing a list of signatures of known exploits (e.g., malicious input strings, malicious files, etc.) to data appliances, such as data appliance 102 as part of a subscription, detecting exploits such as malicious input strings or malicious files (e.g., an on-demand detection, or periodical-based updates to a mapping of input strings or files to indications of whether the input strings or files are malicious or benign), providing a likelihood that an input string or file is malicious or benign, providing/updating a whitelist of input strings or files deemed to be benign, providing/updating input strings or files deemed to be malicious, identifying malicious input strings, detecting malicious input strings, detecting malicious files, predicting whether an input string or file is malicious, and providing an indication that an input string or file is malicious (or benign). In various embodiments, results of analysis (and additional information pertaining to applications, domains, etc.) are stored in database 160. In various embodiments, security service 140 comprises one or more dedicated commercially available hardware servers (e.g., having multi-core processor(s), 32 G+ of RAM, gigabit network interface adaptor(s), and hard drive(s)) running typical server-class operating systems (e.g., Linux). Security service 140 can be implemented across a scalable infrastructure comprising multiple such servers, solid state drives, and/or other applicable high-performance hardware. Security service 140 can comprise several distributed components, including components provided by one or more third parties. For example, portions or all of security service 140 can be implemented using the Amazon Elastic Compute Cloud (EC2) and/or Amazon Simple Storage Service (S3). Further, as with data appliance 102, whenever security service 140 is referred to as performing a task, such as storing data or processing data, it is to be understood that a sub-component or multiple sub-components of security service 140 (whether individually or in cooperation with third party components) may cooperate to perform that task. As one example, security service 140 can optionally perform static/dynamic analysis in cooperation with one or more virtual machine (VM) servers. An example of a virtual machine server is a physical machine comprising commercially available server-class hardware (e.g., a multi-core processor, 32+ Gigabytes of RAM, and one or more Gigabit network interface adapters) that runs commercially available virtualization software, such as VMware ESXi, Citrix XenServer, or Microsoft Hyper-V. In some embodiments, the virtual machine server is omitted. Further, a virtual machine server may be under the control of the same entity that administers security service 140 but may also be provided by a third party. As one example, the virtual machine server can rely on EC2, with the remainder portions of security service 140 provided by dedicated hardware owned by and under the control of the operator of security service 140.

In some embodiments, system 100 uses security service 140 to perform processing with respect to traffic data off-loaded by data appliance 102. Security service 140 provides one or more services to data appliance 102, client device 120, etc. Examples of services provided by security service 140 (e.g., the cloud service entity) include a data loss prevention (DLP) service, an application cloud engine (ACE) service (e.g., a service for identifying a type of application based on a pattern or fingerprint of traffic), Machine learning Command Control (MLC2) service, an advanced URL filtering (AUF) service, a threat detection service, an enterprise data leak service (e.g., detecting data leaks or identifying sources of leaks), and an Internet of Things (IoT) service. Various other services can similarly be implemented, including, for example, Advanced Wildfire (e.g., a commercially available inline machine learning-based engine that prevents malicious content in common file types, which is commercially available from Palo Alto Networks, Inc., headquartered in Santa Clara, CA).

In some embodiments, system 100 (e.g., malicious sample detector 170, security service 140, etc.) trains a detection model to detect exploits (e.g., malicious samples), malicious traffic, and/or other malicious/nefarious/undesirable activity/behavior, etc. Security service 140 may store blacklists, whitelists, etc. with respect to data (e.g., mappings of signatures to malicious files, etc.). In response to processing traffic data, security service 140 may send an update to inline security entities, such as data appliance 102. For example, security service 140 provides an update to a mapping of signatures to malicious files, an update to a mapping of signatures to benign files, etc.

According to various embodiments, the model(s) trained by system 100 (e.g., security service 140) are obtained using a machine learning process (e.g., implementing various machine learning techniques (MLT)). Examples of machine learning processes that can be implemented in connection with training the model(s) include random forest, linear regression, support vector machine, naive Bayes, logistic regression, K-nearest neighbors, decision trees, gradient boosted decision trees, K-means clustering, hierarchical clustering, density-based spatial clustering of applications with noise (DBSCAN) clustering, principal component analysis, etc. In some embodiments, the system trains an XGBoost machine learning classifier model. As an example, inputs to the classifier (e.g., the XGBoost machine learning classifier model) are a combined feature vector or set of feature vectors and based on the combined feature vector or set of feature vectors the classifier model determines whether the corresponding traffic (e.g., input string) is malicious, or a likelihood that the traffic is malicious (e.g., whether the traffic is exploit traffic).

According to various embodiments, security service 140 includes a malicious sample detector 170. Malicious sample detector 170 is used in connection with determining whether a sample (e.g., traffic data) is malicious. In response to receiving a sample (e.g., an input string such as an input string input in connection with a log-in attempt), malicious sample detector 170 analyzes the sample (e.g., the input string), and determines whether the sample is malicious. For example, malicious sample detector 170 determines one or more feature vectors for the sample (e.g., a combined feature vector), and uses a model to determine (e.g., predict) whether the sample is malicious. Malicious sample detector 170 determines whether the sample is malicious based at least in part on one or more attributes of the sample. In some embodiments, malicious sample detector 170 receives a sample, performs a feature extraction (e.g., a feature extraction with respect to one or more attributes of the input string), and determines (e.g., predicts) whether the sample (e.g., an SQL or command injection string) is malicious based at least in part on the feature extraction results. For example, malicious sample detector 170 uses a classifier (e.g., a detection model) to determine (e.g., predict) whether the sample is malicious based at least in part on the feature extraction results. In some embodiments, the classifier corresponds to a model (e.g., the detection model) to determine whether a sample is malicious, and the model is trained using a machine learning process.

In some embodiments, malicious sample detector 170 comprises one or more of traffic parser 172, prediction engine 174, ML model 176, and/or cache 178.

Traffic parser 172 is used in connection with determining (e.g., isolating) one or more attributes associated with a sample being analyzed. As an example, in the case of a file, traffic parser 172 can parse/extract information from the file, such as from a header of the file. The information obtained from the file may include libraries, functions, or files invoked/called by the file being analyzed, an order of calls, etc. As another example, in the case of an input string, traffic parser 172 determines sets of alphanumeric characters or values associated with the input string. In some embodiments, traffic parser 172 obtains one or more attributes associated with (e.g., from) the input string. For example, traffic parser 172 obtains from the input string one or more patterns (e.g., a pattern of alphanumeric characters), one or more sets of alphanumeric characters, one or more commands, one or more pointers or links, one or more IP addresses, etc.

In some embodiments, one or more feature vectors corresponding to the input string are determined by malicious sample detector 170 (e.g., traffic parser 172 or prediction engine 174). For example, the one or more feature vectors are determined (e.g., populated) based at least in part on the one or more characteristics or attributes associated with the sample (e.g., the one or more attributes or set of alphanumeric characters or values associated with the input string in the case that the sample is an input string). As an example, traffic parser 172 uses the one or more attributes associated with the sample in connection with determining the one or more feature vectors. In some implementations, traffic parser 172 determines a combined feature vector based at least in part on the one or more feature vectors corresponding to the sample. As an example, a set of one or more feature vectors is determined (e.g., set or defined) based at least in part on the model used to detect exploits. Malicious sample detector 170 can use the set of one or more feature vectors to determine the one or more attributes of patterns that are to be used in connection with training or implementing the model (e.g., attributes for which fields are to be populated in the feature vector, etc.). The model may be trained using a set of features that are obtained based at least in part on a sample malicious traffic, such as a set of features corresponding to predefined regex statements and/or a set of feature vectors determined based on an algorithmic-based feature extraction. For example, the model is determined based at least in part on performing a malicious feature extraction in connection with generating (e.g., training) a model to detect exploits. The malicious feature extraction can include one or more of (i) using predefined regex statements to obtain specific features from files, or SQL and command injection strings, and (ii) using an algorithmic-based feature extraction to filter out described features from a set of raw input data.

In response to receiving a sample for which malicious sample detector 170 is to determine whether the sample is malicious (or a likelihood that the sample is malicious), malicious sample detector 170 determines the one or more feature vectors (e.g., individual feature vectors corresponding to a set of predefined regex statements, individual feature vectors corresponding to attributes or patterns obtained using an algorithmic-based analysis of exploits, and/or a combined feature vector of both, etc.). As an example, in response to determining (e.g., obtaining) the one or more feature vectors, malicious sample detector 170 (e.g., traffic parser 172) provides (or makes accessible) the one or more feature vectors to prediction engine 174 (e.g., in connection with obtaining a prediction of whether the sample is malicious). As another example, malicious sample detector 170 (e.g., traffic parser 172) stores the one or more feature vectors such as in cache 178 or database 160.

In some embodiments, prediction engine 174 determines whether the sample is malicious based at least in part on one or more of (i) a mapping of samples to indications of whether the corresponding samples are malicious, (ii) a mapping of an identifier for a sample (e.g., a hash or other signature associated with the sample) to indications of whether the corresponding sample is malicious, and/or (iii) a classifier (e.g., a model trained using a machine learning process). In some embodiments, determining whether the sample based on identifiers to indications that the sample is malicious may be performed at data appliance 102, and for a sample for which an associated identifier is not stored in the mapping(s), data appliance 102 offloads processing of the sample to security service 140.

Prediction engine 174 is used to predict whether a sample is malicious. In some embodiments, prediction engine 174 determines (e.g., predicts) whether a received sample is malicious. According to various embodiments, prediction engine 174 determines whether a newly received sample is malicious based at least in part on characteristics/attributes pertaining to the sample (e.g., regex statements, information obtained from a file header, calls to libraries, APIs, etc.). For example, prediction engine 174 applies a machine learning model to determine whether the newly received sample is malicious. Applying the machine learning model to determine whether the sample is malicious may include prediction engine 174 querying machine learning model 176 (e.g., with information pertaining to the sample, one or more feature vectors, etc.). In some implementations, machine learning model 176 is pre-trained and prediction engine 174 does not need to provide a set of training data (e.g., sample malicious traffic and/or sample benign traffic) to machine learning model 176 contemporaneous with a query for an indication/determination of whether a particular sample is malicious. In some embodiments, prediction engine 174 receives information associated with whether the sample is malicious (e.g., an indication that the sample is malicious). For example, prediction engine 174 receives a result of a determination or analysis by machine learning model 176. In some embodiments, prediction engine 174 receives from machine learning model 176 an indication of a likelihood that the sample is malicious. In response to receiving the indication of the likelihood that the sample is malicious, prediction engine 174 determines (e.g., predicts) whether the sample is malicious based at least in part on the likelihood that the sample is malicious. For example, prediction engine 174 compares the likelihood that the sample is malicious to a likelihood threshold value. In response to a determination that the likelihood that the sample is malicious is greater than a likelihood threshold value, prediction engine 174 may deem (e.g., determine that) the sample to be malicious.

According to various embodiments, in response to prediction engine 174 determining that the received sample is malicious, security service 140 sends to a security entity (e.g., data appliance 102) an indication that the sample is malicious. For example, malicious sample detector 170 may send to an inline security entity (e.g., a firewall) or network node (e.g., a client) an indication that the sample is malicious. The indication that the sample is malicious may correspond to an update to a blacklist of samples (e.g., corresponding to malicious samples) such as in the case that the received sample is deemed to be malicious, or an update to a whitelist of samples (e.g., corresponding to non-malicious samples) such as in the case that the received sample is deemed to be benign. In some embodiments, malicious sample detector 170 sends a hash or signature corresponding to the sample in connection with the indication that the sample is malicious or benign. The security entity or endpoint may compute a hash or signature for a sample and perform a look up against a mapping of hashes/signatures to indications of whether samples are malicious/benign (e.g., query a whitelist and/or a blacklist). In some embodiments, the hash or signature uniquely identifies the sample.

Prediction engine 174 is used in connection with determining whether the sample (e.g., an input string) is malicious (e.g., determining a likelihood or prediction of whether the sample is malicious). Prediction engine 174 uses information pertaining to the sample (e.g., one or more attributes, patterns, etc.) in connection with determining whether the corresponding sample is malicious.

In response to receiving a sample to be analyzed, malicious sample detector 170 can determine whether the sample corresponds to a previously analyzed sample (e.g., whether the sample matches a sample associated with historical information for which a maliciousness determination has been previously computed). As an example, malicious sample detector 170 determines whether an identifier or representative information corresponding to the sample is comprised in the historical information (e.g., a blacklist, a whitelist, etc.). In some embodiments, representative information corresponding to the sample is a hash or signature of the sample. In some embodiments, malicious sample detector 170 (e.g., prediction engine 174) determines whether information pertaining to a particular sample is comprised in a dataset of historical input strings and historical information associated with the historical dataset indicating whether a particular sample is malicious (e.g., a third-party service such as VirusTotal™). In response to determining that information pertaining to a particular sample is not comprised in, or available in, the dataset of historical input strings and historical information, malicious sample detector 170 may deem the sample has not yet been analyzed and malicious sample detector 170 can invoke an analysis (e.g., a dynamic analysis) of the sample in connection with determining (e.g., predicting) whether the sample is malicious (e.g., malicious sample detector 170 can query a classifier based on the sample in connection with determining whether the sample is malicious). An example of the historical information associated with the historical samples indicating whether a particular sample is malicious corresponds to a VirusTotal® (VT) score. In the case of a VT score greater than 0 for a particular sample, the particular sample is deemed malicious by the third-party service. In some embodiments, the historical information associated with the historical samples indicating whether a particular sample is malicious corresponds to a social score such as a community-based score or rating (e.g., a reputation score) indicating that a sample is malicious or likely to be malicious. The historical information (e.g., from a third-party service, a community-based score, etc.) indicates whether other vendors or cyber security organizations deem the particular sample to be malicious.

In some embodiments, malicious sample detector 170 (e.g., prediction engine 174) determines that a received sample is newly analyzed (e.g., that the sample is not within the historical information/dataset, is not on a whitelist or blacklist, etc.). Malicious sample detector 170 (e.g., traffic parser 172) may detect that a sample is newly analyzed in response to security service 140 receiving the sample from a security entity (e.g., a firewall) or endpoint within a network. For example, malicious sample detector 170 determines that a sample is newly analyzed contemporaneous with receipt of the sample by security service 140 or malicious sample detector 170. As another example, malicious sample detector 170 (e.g., prediction engine 174) determines that a sample is newly analyzed according to a predefined schedule (e.g., daily, weekly, monthly, etc.), such as in connection with a batch process. In response to determining that a sample is received that has not yet been analyzed with respect to whether such sample is malicious (e.g., the system does not comprise historical information with respect to such input string), malicious sample detector 170 determines whether to use an analysis (e.g., dynamic analysis) of the sample (e.g., to query a classifier to analyze the sample or one or more feature vectors associated with the sample, etc.) in connection with determining whether the sample is malicious, and malicious sample detector 170 uses a classifier with respect to a set of feature vectors or a combined feature vector associated with characteristics or relationships of attributes or characteristics in the sample.

Machine learning model 176 predicts whether a sample (e.g., a newly received sample) is malicious based at least in part on a model. As an example, the model is pre-stored and/or pre-trained. The model can be trained using various machine learning processes. According to various embodiments, machine learning model 176 uses a relationship and/or pattern of attributes and/or characteristics, relationships among attributes or characteristics for the sample, and/or a training set to estimate whether the sample is malicious, such as to predict a likelihood that the sample is malicious. For example, machine learning model 176 uses a machine learning process to analyze a set of relationships between an indication of whether a sample is malicious (or benign), and one or more attributes pertaining to the sample and uses the set of relationships to generate a prediction model for predicting whether a particular sample is malicious. In some embodiments, in response to predicting that a particular sample is malicious, an association between the sample and the indication that the sample is malicious is stored such as at malicious sample detector 170 (e.g., cache 178). In some embodiments, in response to predicting a likelihood that a particular sample is malicious, an association between the sample and the likelihood that the sample is malicious is stored such as at malicious sample detector 170 (e.g., cache 178). Machine learning model 176 may provide the indication of whether a sample is malicious, or a likelihood that the sample is malicious, to prediction engine 174. In some implementations, machine learning model 176 provides prediction engine 174 with an indication that the analysis by machine learning model 176 is complete and that the corresponding result (e.g., the prediction result) is stored in cache 178.

Cache 178 stores information pertaining to a sample (e.g., an input string). In some embodiments, cache 178 stores mappings of indications of whether an input string is malicious (or likely malicious) to particular input strings, or mappings of indications of whether a sample is malicious (or likely malicious) to hashes or signatures corresponding to samples. Cache 178 may store additional information pertaining to a set of samples such as attributes of the samples, hashes or signatures corresponding to a sample in the set of samples, other unique identifiers corresponding to a sample in the set of samples, etc. In some embodiments, inline security entities, such as data appliance 102, store a cache that corresponds to, or is similar to, cache 178. For example, the inline security entities may use the local caches to perform inline processing of traffic data, such as low-latency processing.

Returning to FIG. 1, suppose that a malicious individual (using client device 120) has created malware or malicious input string 130. The malicious individual hopes that a client device, such as client device 104, will execute a copy of malware or other exploit (e.g., malware or malicious input string) 130, compromising the client device, and causing the client device to become a bot in a botnet. The compromised client device can then be instructed to perform tasks (e.g., cryptocurrency mining, or participating in denial-of-service attacks) and/or to report information to an external entity (e.g., associated with such tasks, exfiltrate sensitive corporate data, etc.), such as command and control (C&C) server 150, as well as to receive instructions from C&C server 150, as applicable.

The environment shown in FIG. 1 includes three Domain Name System (DNS) servers (122-126). As shown, DNS server 122 is under the control of ACME (for use by computing assets located within enterprise network 110), while DNS server 124 is publicly accessible (and can also be used by computing assets located within network 110 as well as other devices, such as those located within other networks (e.g., networks 114 and 116)). Enterprise DNS server 122 is configured to resolve enterprise domain names into IP addresses and is further configured to communicate with one or more external DNS servers (e.g., DNS servers 124 and 126) to resolve domain names as applicable.

In order to connect to a legitimate domain (e.g., www.example.com depicted as website 128), a client device, such as client device 104, will need to resolve the domain to a corresponding Internet Protocol (IP) address. One way such resolution can occur is for client device 104 to forward the request to DNS server 122 and/or 124 to resolve the domain. In response to receiving a valid IP address for the requested domain name, client device 104 can connect to website 128 using the IP address. Similarly, in order to connect to malicious C&C server 150, client device 104 will need to resolve the domain, "kj32hkjqfeuo32ylhkjshdflu23.badsite.com," to a corresponding Internet Protocol (IP) address. In this example, malicious DNS server 126 is authoritative for *.badsite.com and client device 104's request will be forwarded (for example) to DNS server 126 to resolve, ultimately allowing C&C server 150 to receive data from client device 104.

Data appliance 102 is configured to enforce policies regarding communications between client devices, such as client devices 104 and 106, and nodes outside of enterprise network 110 (e.g., reachable via external network 118). Examples of such policies include ones governing traffic shaping, quality of service, and routing of traffic. Other examples of policies include security policies such as ones requiring the scanning for threats in incoming (and/or outgoing) email attachments, website content, information input to a web interface such as a login screen, files exchanged through instant messaging programs, and/or other file transfers, and/or quarantining or deleting files or other exploits identified as being malicious (or likely malicious). In some embodiments, data appliance 102 is also configured to enforce policies with respect to traffic that stays within enterprise network 110. In some embodiments, a security policy includes an indication that network traffic (e.g., all network traffic, a particular type of network traffic, etc.) is to be classified/scanned by a classifier stored in local cache or otherwise that certain detected network traffic is to be further analyzed (e.g., using a finer detection model) such as by offloading processing to security service 140.

In various embodiments, data appliance 102 includes signatures 134 (e.g., periodically updated from security service 140) and an inline machine learning antivirus (MLAV) module 135, which is configured to facilitate ML-based malware detection (e.g., the MLAV model component can be implemented as further described in U.S. Pat. Nos. 11,374,946 and 11,636,208, which are both incorporated herein by reference in their entirety). Using processing described in more detail below, security service 140 will determine (e.g., using a malicious file detector that may be similar to malicious sample detector 170 such as by using a machine learning model to detect/predict whether the file is malicious) whether a sample (e.g., a file) is a malicious file (or likely to be a malicious file) and provide a result back to data appliance 102 (e.g., "malicious file" or "benign file").

In some embodiments, malicious sample detector 170 provides to a security entity, such as data appliance 102, an indication whether a sample is malicious. For example, in response to determining that the sample is malicious, malicious sample detector 170 sends an indication that the sample is malicious to data appliance 102, and the data appliance may in turn enforce one or more security policies based at least in part on the indication that the sample is malicious. The one or more security policies may include isolating/quarantining the input string or file, deleting the sample, ensuring that the sample is not executed or resolved, alerting or prompting the user of the maliciousness of the sample prior to the user opening/executing the sample, etc. As another example, in response to determining that the sample is malicious, malicious sample detector 170 provides to the security entity an update of a mapping of samples (or hashes, signatures, or other unique identifiers corresponding to samples) to indications of whether a corresponding sample is malicious, or an update to a blacklist for malicious samples (e.g., identifying samples) or a whitelist for benign samples (e.g., identifying samples that are not deemed malicious).

Figure 2A:
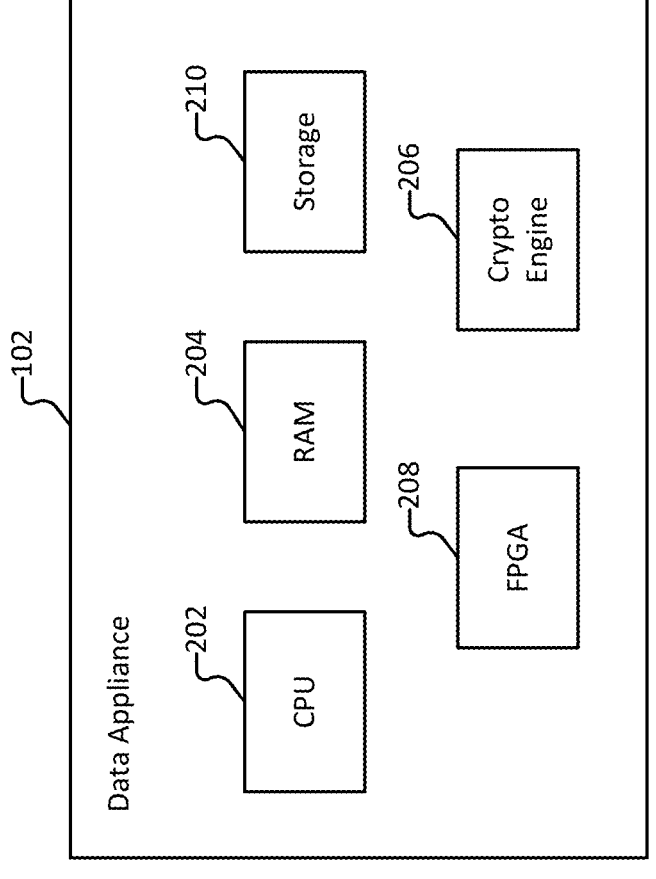
FIG. 2A illustrates an embodiment of a data appliance.

FIG. 2A illustrates an embodiment of a data appliance. An embodiment of an inline security entity, such as data appliance 102, is shown in FIG. 2A. The example shown is a representation of physical components that are included in data appliance 102, in various embodiments. Specifically, data appliance 102 includes a high-performance multi-core Central Processing Unit (CPU) 202 and Random Access Memory (RAM) 204. Data appliance 102 also includes a storage 210 (such as one or more hard disks or solid-state storage units). In various embodiments, data appliance 102 stores (whether in RAM 204, storage 210, and/or other appropriate locations) information used in monitoring enterprise network 110 and implementing disclosed techniques. Examples of such information include application identifiers, content identifiers, user identifiers, requested URLs, IP address mappings, policy and other configuration information, signatures, hostname/URL categorization information, malware profiles, and machine learning models. Data appliance 102 can also include one or more optional hardware accelerators. For example, data appliance 102 can include a cryptographic engine 206 configured to perform encryption and decryption operations, and one or more Field Programmable Gate Arrays (FPGAs) 208 configured to perform matching, act as network processors, and/or perform other tasks.

Functionality described herein as being performed by data appliance 102 can be provided/implemented in a variety of ways. For example, data appliance 102 can be a dedicated device or set of devices. The functionality provided by data appliance 102 can also be integrated into or executed as software on a general-purpose computer, a computer server, a gateway, and/or a network/routing device. In some embodiments, at least some services described as being provided by data appliance 102 are instead (or in addition) provided to a client device (e.g., client device 104 or client device 106) by software executing on the client device.

Whenever data appliance 102 is described as performing a task, a single component, a subset of components, or all components of data appliance 102 may cooperate to perform the task. Similarly, whenever a component of data appliance 102 is described as performing a task, a subcomponent may perform the task and/or the component may perform the task in conjunction with other components. In various embodiments, portions of data appliance 102 are provided by one or more third parties. Depending on factors such as the amount of computing resources available to data appliance 102, various logical components and/or features of data appliance 102 may be omitted and the techniques described herein adapted accordingly. Similarly, additional logical components/features can be included in embodiments of data appliance 102 as applicable. One example of a component included in data appliance 102 in various embodiments is an application identification engine which is configured to identify an application (e.g., using various application signatures for identifying applications based on packet flow analysis). For example, the application identification engine can determine what type of traffic a session involves, such as Web Browsing-Social Networking; Web Browsing-News; SSH; and so on.

Figure 2B:
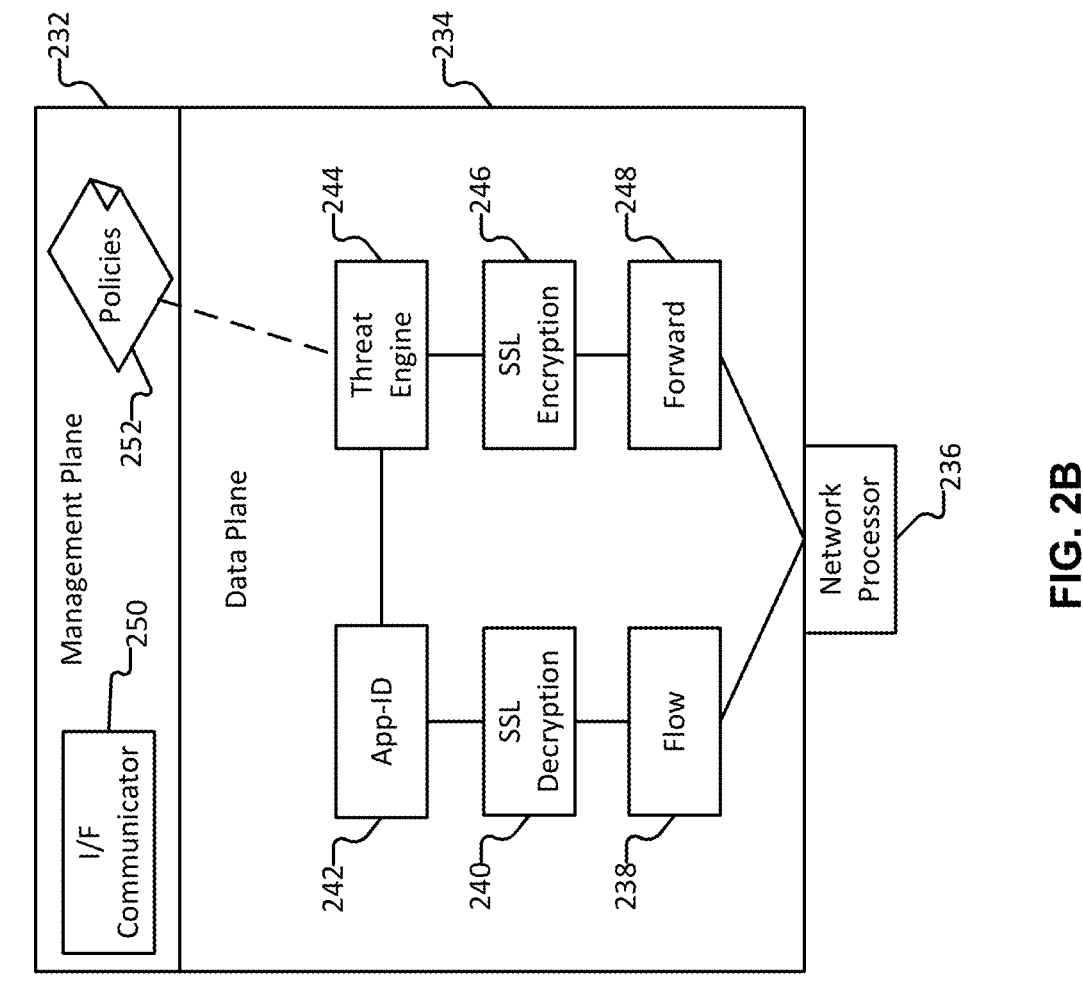
FIG. 2B is a functional diagram of logical components of an embodiment of a data appliance.

FIG. 2B is a functional diagram of logical components of an embodiment of a data appliance. The example shown is a representation of logical components that can be included in an inline security appliance, such as data appliance 102, in various embodiments. Unless otherwise specified, various logical components of data appliance 102 are generally implementable in a variety of ways, including as a set of one or more scripts (e.g., written in Go, Java, Python, etc., as applicable).

As shown, data appliance 102 comprises a firewall, and includes a management plane 232 and a data plane 234. The management plane is responsible for managing user interactions, such as by providing a user interface for configuring policies and viewing log data. The data plane is responsible for managing data, such as by performing packet processing and session handling. The data plane may be further responsible for offloading processing to a cloud system/service, such as by communicating a request message to the cloud system/service without mediation or forwarding the message through the management plane, such as further described herein.

Network processor 236 is configured to receive packets from client devices, such as client device 108, and provide them to data plane 234 for processing. Whenever flow module 238 identifies packets as being part of a new session, it creates a new session flow. Subsequent packets will be identified as belonging to the session based on a flow lookup. If applicable, SSL decryption is applied by SSL decryption engine 240. Otherwise, processing by SSL decryption engine 240 is omitted. Decryption engine 240 can help data appliance 102 inspect and control SSL/TLS and SSH encrypted traffic, and thus help to stop threats that might otherwise remain hidden in encrypted traffic. Decryption engine 240 can also help prevent sensitive content from leaving enterprise network 110. Decryption can be controlled (e.g., enabled or disabled) selectively based on parameters such as: URL category, traffic source, traffic destination, user, user group, and port. In addition to decryption policies (e.g., that specify which sessions to decrypt), decryption profiles can be assigned to control various options for sessions controlled by the policy. For example, the use of specific cipher suites and encryption protocol versions can be required.

Application identification (APP-ID) engine 242 is configured to determine what type of traffic a session involves. As one example, application identification engine 242 can recognize a GET request in received data and conclude that the session requires an HTTP decoder. In some cases, such as a web browsing session, the identified application can change, and such changes will be noted by data appliance 102. For example, a user may initially browse to a corporate Wiki (classified based on the URL visited as "Web Browsing-Productivity") and then subsequently browse to a social networking site (classified based on the URL visited as "Web Browsing-Social Networking"). Different types of protocols have corresponding decoders.

Based on the determination made by application identification engine 242, the packets are sent, by threat engine 244, to an appropriate decoder configured to assemble packets (which may be received out of order) into the correct order, perform tokenization, and extract out information. Threat engine 244 also performs signature matching to determine what should happen to the packet. As needed, SSL encryption engine 246 can re-encrypt decrypted data. Packets are forwarded using a forward module 248 for transmission (e.g., to a destination).

As also shown in FIG. 2B, policies 252 are received and stored in management plane 232. Policies can include one or more rules, which can be specified using domain and/or host/server names, and rules can apply one or more signatures or other matching criteria or heuristics, such as for security policy enforcement for subscriber/IP flows based on various extracted parameters/information from monitored session traffic flows. An interface (I/F) communicator 250 is provided for management communications (e.g., via (REST) APIs, messages, or network protocol communications or other communication mechanisms).

Various other services may be implemented on data plane 234. The plurality of services/processes running on the data plane(s) of the inline security entity are configured to store request messages in a shared memory, and another process on the data plane (e.g., on a message reader side of the data plane), such as a daemon, reads the message and facilitates communication of the request message to the cloud security entity (e.g., security platform 140 of system 100). As described above, various embodiments enforce quotas with respect to a number of request messages that may be buffered/queued in the shared memory by a service/process running on the data plane of the inline security entity. Enforcing quotas prevents the message-reader side of the data plane(s) of inline security entity to be overwhelmed by request messages written by the plurality of processes to the same shared memory.

Automating Satellite Device Authentication to a Portal for Secure Remote Access

Figure 3:
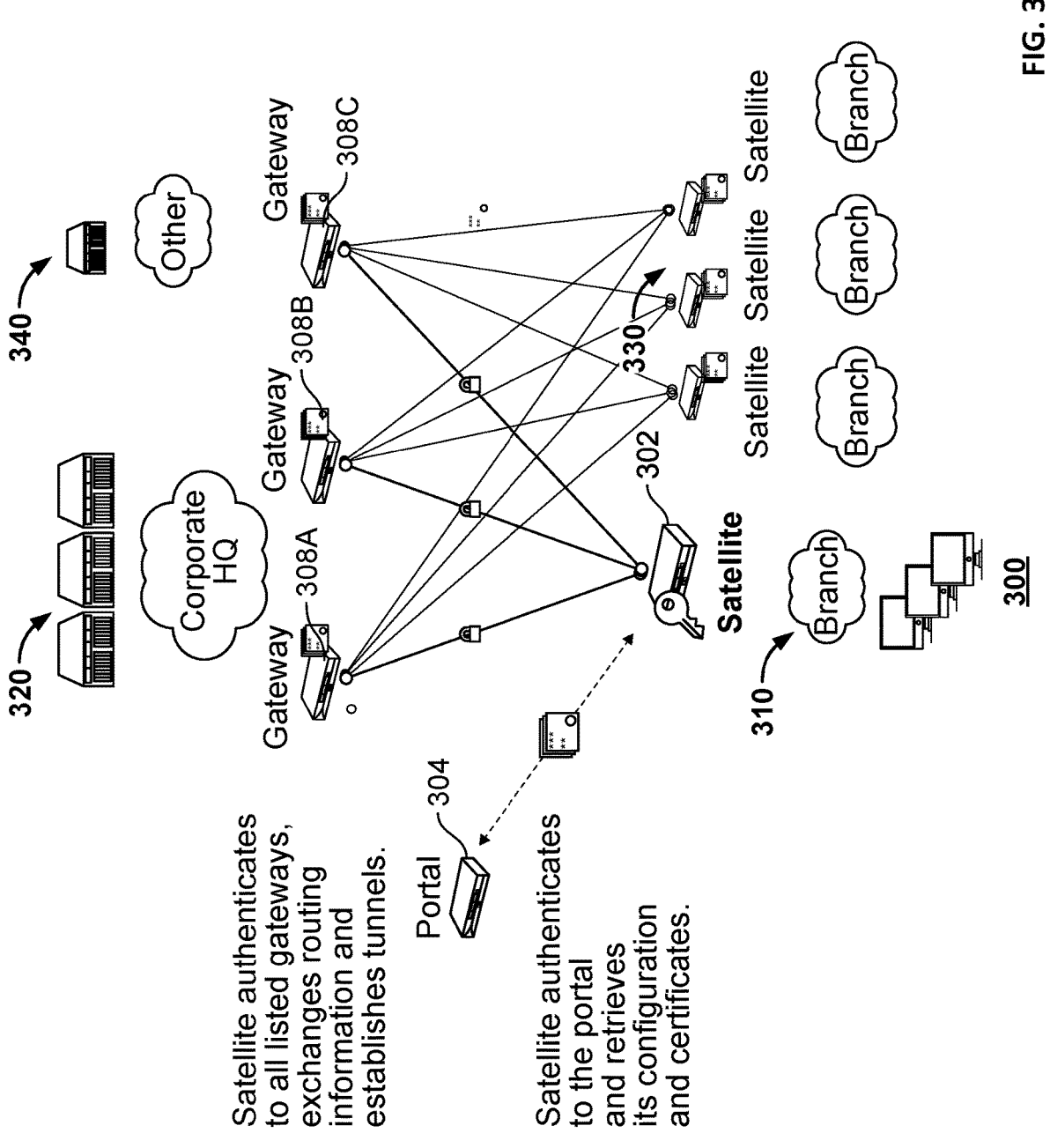
FIG. 3 illustrates a functional diagram of a sample Large Scale VPN (LSVPN) deployment topology in accordance with some embodiments.

FIG. 3 illustrates a functional diagram of a sample Large Scale VPN (LSVPN) deployment topology in accordance with some embodiments. As shown in FIG. 3, a LSVPN deployment topology 300 includes a corporate headquarters 320 and various other data center/office/computing sites such as shown at 340 as well as other branch offices as shown at 330 that are in secure communication via their own satellite nodes (e.g., satellites, such as firewalls, which can be implemented as a data appliance/firewall device 102 as similarly described above with respect to FIGS. 1-2B).

Referring to FIG. 3, in this example enterprise computing environment, a new satellite 302 (e.g., a firewall that can be implemented as a data appliance/firewall device 102 as similarly described above with respect to FIGS. 1-2B) is to be deployed at a branch office 310. A portal for secure remote access is shown at 304. Satellite 302 is configured to automatically authenticate to portal 304. Satellite 302 is further configured to automatically retrieve a configuration and certificates from portal 304. The configuration information is then used by satellite 302 to automatically authenticate to all listed gateways, which are shown at 308A, 308B, and 308C, and then to exchange routing information and to establish secure tunnels (e.g., using the previously retrieved certificates).

Specifically, in this example implementation, the disclosed techniques for providing automated satellite device authentication to a portal for secure remote access include a mechanism in which the admin performs the following (e.g., prior to deployment and/or performed remotely from the remote location of the satellite deployment): (1) pre-configures the satellite (302), which can then be deployed at the remote location; and (2) configures the Serial Number (SN) and Internet Protocol (IP) address of the satellite (302) to the IP address allowed list on the portal for secure remote access (304) (e.g., GP portal). In addition, a new authentication mechanism is provided at the portal for secure remote access (e.g., GP portal) in which the SN and IP address can be used in combination to automatically authenticate the satellite device as will be further described below. As such, whenever the satellite attempts to authenticate with the portal for secure remote access (e.g., GP portal), the satellite authenticates based on whether the SN is registered and the satellite device's assigned IP address is present in the IP allowed list (e.g., which can be configured at the portal for secure remote access (e.g., GP portal) as described above). Thus, the disclosed techniques facilitate a satellite deployment solution that is automated and does not require manual intervention as similarly described above.

More specifically, in this example implementation, the deployment of a new satellite (302) is automated and does not require manual intervention (e.g., of a user at the branch office (310)) by performing the following pre-deployment and post-deployment operations.

First, configure the satellite's SN on the portal (304).

Second, configure the IP address of the satellite (302) to be allowed in the IP address allowed list on the portal (304).

Third, configure a retry interval timer on the portal (304).

After the above described pre-deployment operations are performed (e.g., order of performing these pre-deployment configurations is not critical), then the new satellites can be shipped to remote locations for new satellite deployments, such as satellite 302 as shown at branch office 310 and/or other satellites can similarly be deployed such as shown at other branch offices as shown at 330.

After the new satellites are deployed at their respective remote locations (e.g., connected to a local network, plugged in and powered on), each of the newly deployed satellites including satellite 302 are configured after booting to automatically connect to the portal (304). During an initial network protocol handshake (e.g., a Secure Sockets Layer (SSL) handshake) between the satellite (302) and the portal (304), the satellite verifies a server certificate of the portal.

In addition, the portal (304) can also be configured to verify a client certificate associated with the satellite (302). As such, this solution effectively eliminates a risk of IP address spoofing (e.g., a non-authorized device attempting to connect to the portal to obtain access to the LSVPN deployment by spoofing its IP address).

After the satellites successful establish a secure connection with the portal (304) and verify the server certificate of the portal, the satellites then each initiate sending their respective SNs and assigned IP addresses during an authentication message exchange to the portal (304). The portal then uses such SN and IP address information to attempt to automatically authenticate each of the newly deployed satellites. The portal verifies that the SN and IP address information match a previously configured SN and that the IP address information matches an IP address previously configured in the IP address allow list as described above.

If authentication fails for a newly deployed satellite, then the portal (304) returns the configured retry interval to the satellite, so that the satellite can automatically retry the authentication process after the received retry interval has elapsed.

If authentication is successful for a newly deployed satellite, such as satellite 302 at branch office 310, then the portal (304) sends a list of IP addresses for gateways (e.g., a gateway IP list, such as a GP gateway IP list for a GP LSVPN deployment). The satellite (302) then automatically establishes a connection with each of the gateways included in the gateway IP list, and during a network protocol handshake (e.g., a Secure Sockets Layer (SSL) handshake), the satellite and gateways exchange their respective digital certificates (e.g., digital certificates from a trusted Certificate Authority (CA) including a client certificate for the satellite and distinct gateway service certificates for each of the gateways). The satellite validates the gateway server certificate, and the gateway verifies the satellite's client certificate.

Thus, the disclosed techniques overcome the above-described manual intervention during the deployment of remote satellite devices by providing automated satellite device authentication to a portal for secure remote access to facilitate a more effective and efficient solution for automated deployment of such satellite devices for secure remote access, such as will be further described below.

FIG. 4 illustrates a configuration settings table for serial number and IP address authentication of a satellite with a portal and a gateway for a Large Scale VPN deployment in accordance with some embodiments. As similarly described above, a newly deployed satellite can initiate a connection to the portal upon successful configuration of the satellite serial number registered and the satellite device IP address in the IP-allowed list (e.g., configured IP addresses in the IP address allow list) on the portal. Specifically, the table shown in FIG. 4 provides details on how such parameter settings are processed for performing the disclosed Serial Number and IP Address Authentication mechanism.

In this example implementation, the following workflow can be performed to authenticate the satellite using the disclosed Serial Number and IP Address Authentication mechanism. As a first stage of the workflow, an administrator (admin) (e.g., Information Technology (IT)/network/security admin) can log in to a user interface (UI) of the portal to add the Serial Number for the new satellite device to the portal's satellite configuration.

As a second stage of the workflow, the admin utilizes the UI of the portal to add the IP address assigned to the new satellite device to the portal's satellite configuration for the IP-allowed list (e.g., configured IP addresses in the IP address allow list) on the portal (e.g., by entering the following command in the portal UI: set global-protect global-protect-portal portal <portal name> satellite-serialnumberip-auth satellite-ip-allowlist entry <value> where <value> is the IPv4 address, IPv6 address, IP range, or IP subnet of the new satellite device being added to the portal configuration). Also, the admin utilizes the UI of the portal to add the retry interval parameter for the serial number and IP address in case of an authentication failure attempt for the satellite attempting to authenticate with the portal (e.g., by entering the following command in the portal UI: username@hostname> set global-protect global-protect-portal portal <name> satellite-serialnumberip-auth retry-interval <value> in which the retry interval range is, for example, 5 to 86400 seconds and default value is 5 seconds in this example implementation; or a retry interval settings parameter can be configured with –1 to disable retry attempts).

As a third stage of the workflow, the admin utilizes the UI of the portal to enable the serial number and IP address authentication method on each portal where the admin elects to enable the disclosed Serial Number and IP Address Authentication mechanism (e.g., by entering the following command in the portal UI: username@hostname> set global-protect-portal satellite-serialnumberip-auth <enable/disable>, in which in this example implementation, the Serial Number and IP Address Authentication mechanism is disabled by default).

Example process embodiments for providing automated satellite device authentication to a portal for secure remote access will now be further described below.

Figure 5:
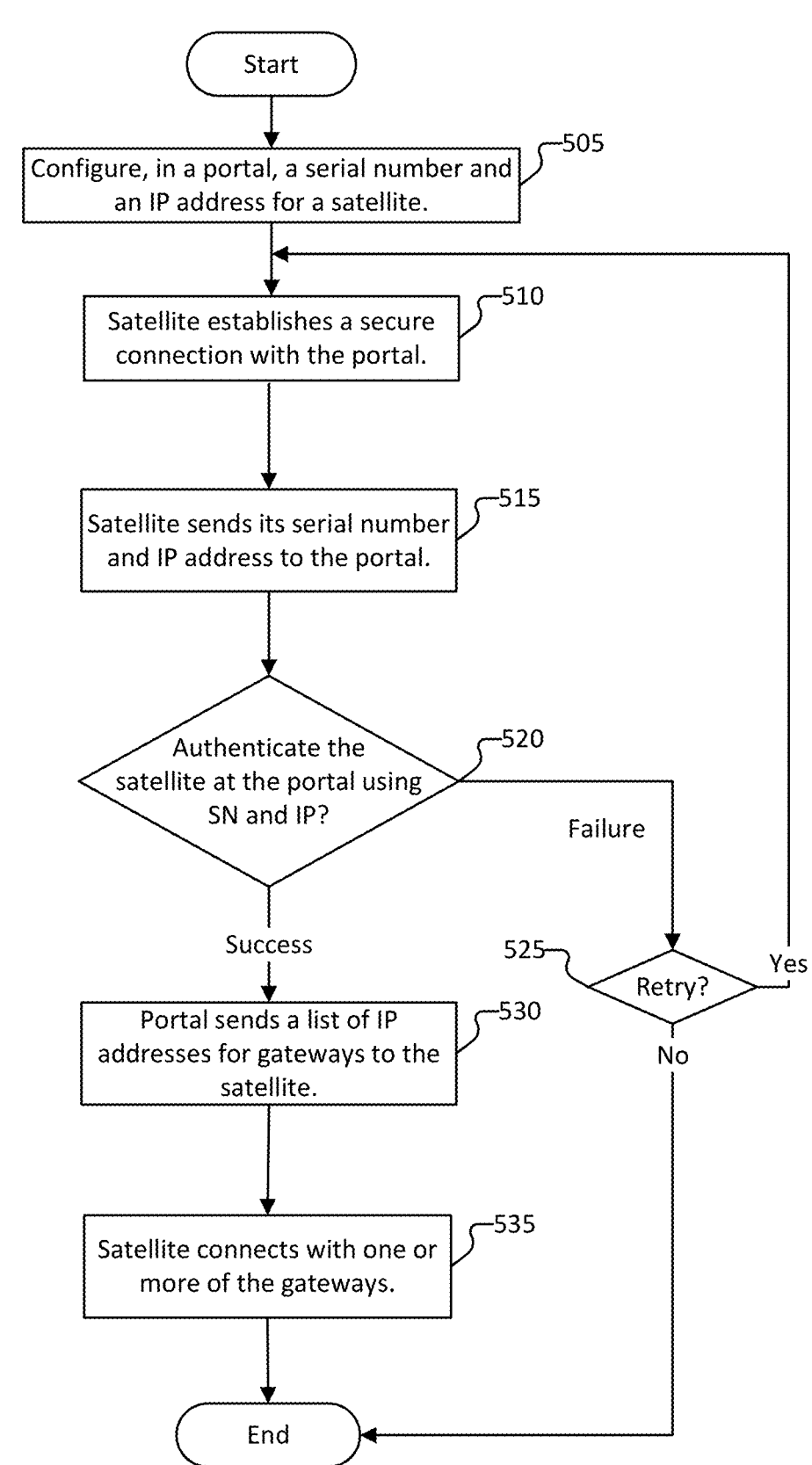
FIG. 5 is a flow diagram of a process for providing automated satellite device authentication to a portal for secure remote access in accordance with some embodiments.

Example Process Embodiments for Automated Satellite Device Authentication to a Portal for Secure Remote Access FIG. 5 is a flow diagram of a process for providing automated satellite device authentication to a portal for secure remote access in accordance with some embodiments. In some embodiments, process 500 is implemented at least in part by entities of the LSVPN deployment 300 of FIG. 3 and/or data appliance 102 of FIGS. 1, 2A, and 2B and/or a satellite 302, portal 304, and gateways 308A-C of FIG. 3 as similarly described above.

At 505, in a portal (e.g., a portal for a LSVPN deployment), a serial number and an IP address for a satellite (e.g., a new satellite to be deployed to a remote location) are configured. For example, an admin can utilize a UI of the portal to configure the serial number (SN) of the satellite. The admin can also add the IP address assigned to the satellite to an IP address Allowed List in the portal configuration as similarly described above with respect to FIGS. 3 and 4.

At 510, the deployed satellite establishes a secure communication with the portal. For example, after the new satellite is deployed at a remote location (e.g., connected to a local network, plugged in and powered on, at the branch office, such as shown in FIG. 3), the satellite is configured after booting to automatically connect to the portal. During an initial network protocol handshake (e.g., a Secure Sockets Layer (SSL) handshake) between the satellite and the portal, the satellite verifies a server certificate of the portal. In addition, the portal (304) can also be configured to verify a client certificate associated with the satellite (302). As such, this solution effectively eliminates a risk of IP address spoofing (e.g., a non-authorized device attempting to connect to the portal to obtain access to the LSVPN deployment by spoofing its IP address) as similarly described above.

At 515, the deployed satellite sends its serial number (SN) and IP address to the portal via the secure communication connection (e.g., SSL channel). In this example implementation, after the satellite successfully establishes a secure connection with the portal and verifies the server certificate of the portal, the satellite then initiates sending its SN and assigned IP address during an authentication message exchange to the portal as similarly described above with respect to FIG. 3.

At 520, the deployed satellite automatically attempts to authenticate with the portal. In this example implementation, after receiving the SN and IP address from the satellite, the portal then uses such SN and IP address information to attempt to automatically authenticate each of the newly deployed satellite. Specifically, the portal verifies that the SN and IP address information match a previously configured SN and that the IP address information matches an IP address previously configured in the IP address allow list as similarly described above with respect to FIG. 3.

At 525, if authentication fails for the newly deployed satellite at 520, then the portal returns the configured retry interval to the satellite, so that the satellite can automatically retry the authentication process after the received retry interval has elapsed as similarly described above with respect to FIGS. 3 and 4. If no retry interval is configured (e.g., or is set to –1 as described above with respect to FIG. 4), then no retry attempt is performed, and processing is completed as shown in FIG. 5.

At 530, if authentication is successful at 520, the portal sends a list of IP addresses for gateways to the satellite. In this example implementation, the authentication is successful for the newly deployed satellite, and the portal (304) sends a list of IP addresses for gateways (e.g., a gateway IP list, such as a GP gateway IP list for a GP LSVPN deployment) as similarly described above with respect to FIG. 3.

At 535, the satellite connects with one or more of the gateways. In this example implementation, the satellite can be configured to automatically establish a connection with each of the gateways included in the gateway IP list (e.g., for the LSVPN deployment), and during a network protocol handshake (e.g., a Secure Sockets Layer (SSL) handshake), the satellite and gateways exchange their respective digital certificates (e.g., digital certificates from a trusted Certificate Authority (CA) including a client certificate for the satellite and distinct gateway service certificates for each of the gateways). The satellite validates the gateway server certificate, and the gateway verifies the satellite's client certificate as similarly described above with respect to FIG. 3.

Thus, the disclosed techniques overcome the above-described manual intervention during the deployment of remote satellite devices by providing automated satellite device authentication to a portal for secure remote access to facilitate a more effective and efficient solution for automated deployment of such satellite devices for secure remote access, such as similarly described herein with respect to various embodiments.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system comprising:
a processor configured to:
  receive, at a portal, a serial number and an IP address associated with a new satellite for deployment in a large scale virtual private network (LSVPN) deployment, comprising to:
    register the serial number in a data store associated with the portal; and add the IP address associated with the new satellite to an allow list in the data store associated with the portal, wherein the allow list corresponds with output of a machine learning model, wherein the machine learning model is trained using a machine learning technique;

receive, at the portal, the serial number and the IP address associated with the new satellite, wherein the new satellite is deployed at a remote location, and wherein the new satellite automatically sends the serial number and the IP address associated with the new satellite to the portal; and authenticate the new satellite at the portal using the serial number and the IP address associated with the new satellite, comprising to:

determine that the serial number is registered;

determine that the IP address associated with the new satellite is present in the allow list; and in response to a determination that the serial number is registered and the IP address associated with the new satellite is present in the allow list, determine that the new satellite has been authenticated; and a memory coupled to the processor and configured to provide the processor with instructions.

2. The system of claim 1, wherein the new satellite automatically sends the serial number and the IP address associated with the new satellite to the portal via a secure communication channel.

3. The system of claim 1, further comprising:

sending a list of IP addresses for one or more gateways from the portal to the new satellite after successfully authenticating the new satellite using the serial number and the IP address associated with the new satellite.

4. The system of claim 1, further comprising:

performing a retry of the authenticating of the new satellite at the portal using the serial number and the IP address associated with the new satellite after a failed authentication attempt.

5. The system of claim 1, further comprising:

performing a retry of the authenticating of the new satellite at the portal using the serial number and the IP address associated with the new satellite after a failed authentication attempt, wherein the retry is performed after expiration of a configured retry period of time.

6. The system of claim 1, further comprising:

sending a list of IP addresses for one or more gateways from the portal to the new satellite after successfully authenticating the new satellite using the serial number and IP address associated with the new satellite; and connecting from the new satellite to the one or more gateways, wherein the new satellite is securely connected to the one or more gateways that form the LSVPN deployment.

7. A method comprising:

receiving, at a portal, a serial number and an IP address associated with a new satellite for deployment in a large scale virtual private network (LSVPN) deployment, comprising:

registering the serial number in a data store associated with the portal; and adding the IP address associated with the new satellite to an allow list in the data store associated with the portal, wherein the allow list corresponds with output of a machine learning model, wherein the machine learning model is trained using a machine learning technique;

receiving, at the portal, the serial number and the IP address associated with the new satellite, wherein the new satellite is deployed at a remote location, and wherein the new satellite automatically sends the serial number and the IP address associated with the new satellite to the portal; and authenticating the new satellite at the portal using the serial number and the IP address associated with the new satellite, comprising:

determining that the serial number is registered;

determining that the IP address associated with the new satellite is present in the allow list; and in response to a determination that the serial number is registered and the IP address associated with the new satellite is present in the allow list, determining that the new satellite has been authenticated.

8. The method of claim 7, wherein the new satellite automatically sends the serial number and the IP address associated with the new satellite to the portal via a secure communication channel.

9. The method of claim 7, further comprising:

sending a list of IP addresses for one or more gateways from the portal to the new satellite after successfully authenticating the new satellite using the serial number and the IP address associated with the new satellite.

10. The method of claim 7, further comprising:

performing a retry of the authenticating of the new satellite at the portal using the serial number and the IP address associated with the new satellite after a failed authentication attempt.

11. The method of claim 7, further comprising:

performing a retry of the authenticating of the new satellite at the portal using the serial number and the IP address associated with the new satellite after a failed authentication attempt, wherein the retry is performed after expiration of a configured retry period of time.

12. The method of claim 7, further comprising:

sending a list of IP addresses for one or more gateways from the portal to the new satellite after successfully authenticating the new satellite using the serial number and IP address associated with the new satellite; and connecting from the new satellite to the one or more gateways, wherein the new satellite is securely connected to the one or more gateways that form the LSVPN deployment.

13. A computer program product embodied in a non-transitory computer readable medium and comprising computer instructions for:

receiving, at a portal, a serial number and an IP address associated with a new satellite for deployment in a large scale virtual private network (LSVPN) deployment, comprising:

registering the serial number in a data store associated with the portal; and adding the IP address associated with the new satellite to an allow list in the data store associated with the portal, wherein the allow list corresponds with output of a machine learning model, wherein the machine learning model is trained using a machine learning technique;

receiving, at the portal, the serial number and the IP address associated with the new satellite, wherein the new satellite is deployed at a remote location, and wherein the new satellite automatically sends the serial number and the IP address associated with the new satellite to the portal; and authenticating the new satellite at the portal using the serial number and the IP address associated with the new satellite, comprising:

determining that the serial number is registered;

determining that the IP address associated with the new satellite is present in the allow list; and in response to a determination that the serial number is registered and the IP address associated with the new satellite is present in the allow list, determining that the new satellite has been authenticated.

14. The computer program product of claim 13, wherein the new satellite automatically sends the serial number and the IP address associated with the new satellite to the portal via a secure communication channel.

\* \* \* \* \*